Dec. 29, 1925.  
J. BAKKER  
1,567,697  
DEVICE TO PREVENT AN AIRPLANE FROM A TAIL SPIN FALL  
Filed Sept. 23, 1925
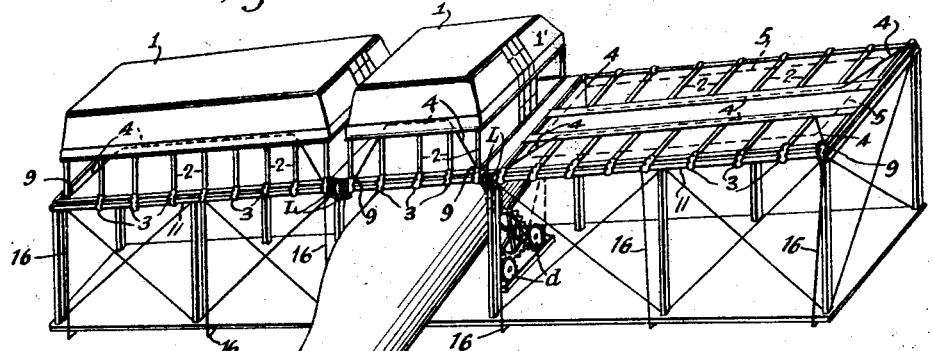
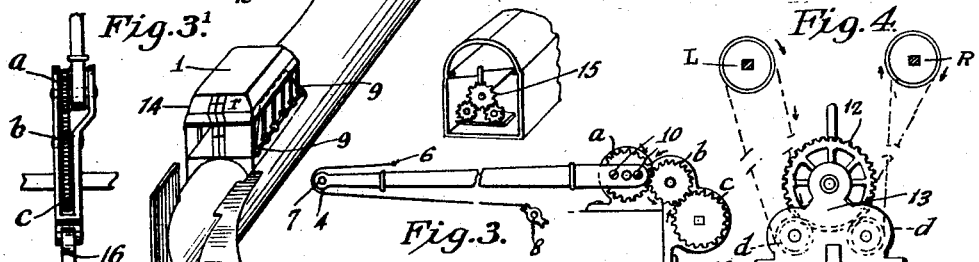
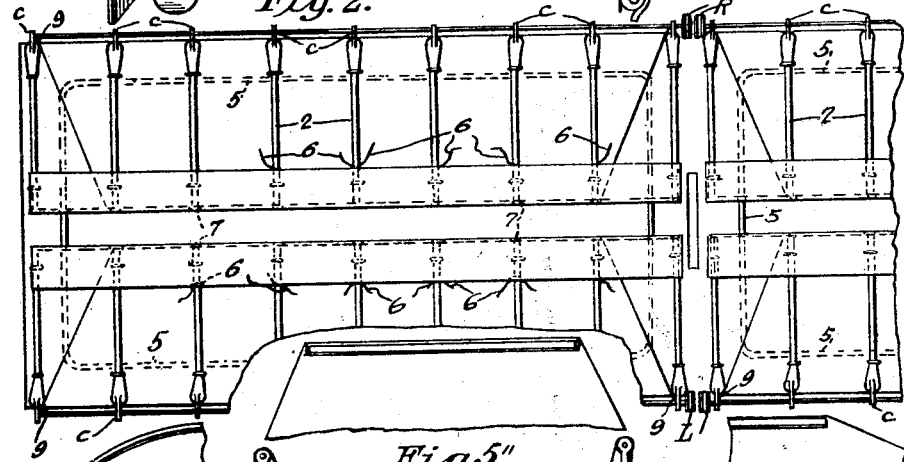
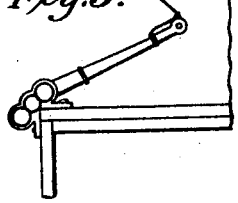
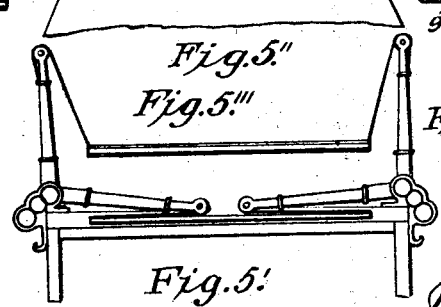
Inventor.  
Jacobus Bakker.

Patented Dec. 29, 1925.

1,567,697

UNITED STATES PATENT OFFICE.

JACOBUS BAKKER, OF MISSOULA, MONTANA.

DEVICE TO PREVENT AN AIRPLANE FROM A TAIL-SPIN FALL.

Application filed September 23, 1925. Serial No. 58,210.

*To all whom it may concern:*

Be it known that I, JACOBUS BAKKER, a citizen of the United States, residing at 1535 Howell Street, Missoula, in the county of Missoula and State of Montana, have invented a new device to Prevent an Airplane from a Tail-Spin Fall with Controllable Parachutes, of which the following is a specification.

My invention relates to improvements in aeroplanes, and it was particularly designed to enable an aviator to escape from a tail spin fall or from a fall brought about by the collapse of one side of the plane or planes. While the invention was particularly devised for the foregoing purpose, its principal object is to furnish mechanism to render an aeroplane safe so that accidents causing dropping of the machine will be reduced to a minimum. A further object of the invention is to furnish an aeroplane with an improved form of parachute which may be raised when an accident occurs in order to permit the aeroplane to resume its equilibrium or to be brought safely to the earth.

A further object of the invention is to provide improved means for launching a parachute from the aeroplane so that the driver of the aeroplane may quickly raise one or more parachutes.

A still further object of the invention is to provide improved means for folding the parachute and returning the same to its housing. Another object of the invention is to furnish the parachute with improved means for aiding in the opening and controlling of the parachute after it has left its housing.

With the foregoing objects outlined, and with other objects in view which will appear as the description proceeds, the invention consists of the novel features hereinafter described in detail, illustrated in the accompanying drawings and more particularly pointed out in the appended claims.

Referring to the drawings:

Figure 1 is a perspective view of an aeroplane provided with my improved safety mechanism and showing three parachutes in raised position, and one in lowered position.

Figure 2 shows a plan view of one side wing parachute and part of center parachute.

Figure 3 shows one rib or arm in connection with the mechanism for raising and lowering the parachute with 3' showing a side view of the mechanism.

Figure 4 shows the control 12.

Figure 5', Figure 5'', Figure 5''', Figure 5$^{IV}$ and Figure 5$^{V}$ show the different motions of the controllable parachute.

Figure 1 shows an aeroplane with a parachute at top of the left wing, arrested by a number of arms or ribs 2; and shows the center parachute carried by its arms and gives an end view while at the right wing a parachute is shown folded, kept in place by a number of arms—which are controlled by the mechanism shown in Fig. 3, $a$, $b$, $c$, and by 3 galvanized wire ropes 4. There is also shown a parachute in action at the tail of the aeroplane and a control where a rope or string is fastened to the handle which from there goes over a little roller to the aviator who, by handling the ropes, can open and control the parachute at the tail.

Similar numerals refer to similar parts throughout the several views.

Figure 2 shows one half of the top view of the parachute in rest, the arms 2 keeping the parachute down, but it shows also the means which fasten the canvas to the arms, strings 6 with lengths long enough to be fastened securely to the arms; then the cloth is laid over the end of the arm. See Figure 3 whereby rings, like a curtain is fastened to a rod, with a strip of canvas stitched securely to the canvas, the canvas is fastened to the galvanized rope 4 and then it is fastened with a strip of canvas (see 8) to a bamboo ½ inch rod 5 which forms a square which keeps the canvas flat and allows the canvas to be in the right place and being flexible allows the raising and lowering of the parachute.

Figure 3 shows an arm of 1½ inch thick bamboo covered at both ends with brass to save the arm from splitting. One end is fastened to a cog wheel and the other end has an eye to receive the galvanized rope 4 which is fastened to the rod 5 to make the arms work in harmony.

The mechanism of Fig. 3 consists of three wheels $a$, $b$, $c$.

The cog wheel $a$ is fastened to the arm 2 with two bolts 10 so that when I lift the arm 2 the cog wheel $a$ turns in the direction shown by arrow and sprocket wheel 6 will be compelled to turn in the opposite direction as arrow shows and as this wheel is connected with wheel c, it makes that wheel turn as arrow shows. Now these wheels are fastened to square-sleeved rings, and that ring is fastened to a ¾ inch rod as axle 11, so that all these wheels c are on one axle 11, and turn in harmony, and this is the case with wheels L and R when fastened to the same axle 11 and these wheels R and L are connected with wheels d, the bottom wheels of the control, with an endless chain; the top wheel is a cog wheel 12 and has a handle to turn it, to right or to left as may be necessary. This wheel 12 moves around an axle which is carried in a frame 13 so the bottom of the wheel 12 will reach an inside sprocket wheel, fastened to wheels d, d and when the wheel turns these two wheels d turn in the same direction but by giving the right hand chain a twist, it makes wheel R turn the other way so it will be going in the direction that the arrow shows when the handle has been coming down towards the right hand side. So when the control stands up in the center then everything is all right but when something goes wrong, and the aeroplane is coming down, then turn the handle down and the parachute will go up immediately.

So when the handle is turned down to right at the same time the parachute opens that is the arms lift from the position shown in Fig. 5' to 5''' and the air presses under the canvas fastened to frame 5, and sends it up in the direction of Fig. 5''; then the aeroplane will come down readily. But if a side blow of wind comes then it is necessary to go down quickly; then press the handle down, (see Fig. 5ᵛ) which drives the air out until it is safe to take the same position back again and then before landing, turn the handle to the left (Fig. 4) and the speed is slacked up. No harm has come to passengers or machine and the parachute has proven to be controllable as well as collapsible.

From the foregoing I believe that the construction, operation and advantages of my invention will be readily understood and appreciated by those skilled in the art and I am satisfied that various changes may be made in the construction shown without departing from the spirit of the invention as expressed in the following claims.

What I claim and desire to secure by Letters Patent is—

1. The combination with an aeroplane of a collapsible, controllable parachute mounted on the top of the supporting surface, said parachute comprising a horizontal frame with a fabric cover, having depending side walls, pivoted arms secured to the lower edges of the side walls, and means for elevating and lowering the arms whereby the parachute can be raised and lowered to operative and inoperative positions.

2. The combination of elements claimed in claim 1 wherein the elevating and lowering mechanism comprises gears on and rigid with the arms and driving connections for operating said gears.

3. The combination of elements claimed in claim 1 wherein the elevating and lowering means includes two main driving wheels for operating the arms.

4. The combination with the elements claimed in claim 1 of a parachute at the tail of the fuselage.

5. The combination of elements claimed in claim 1 in which, when the parachute is inoperative, the arms are horizontal and hold the parachute frame against the upper surface of the wing with the fabric side walls folded between the parachute frame and the arms.

JACOBUS BAKKER.